W. JONES.
Garden-Weeding Implements.
No. 143,354.  Patented September 30, 1873.
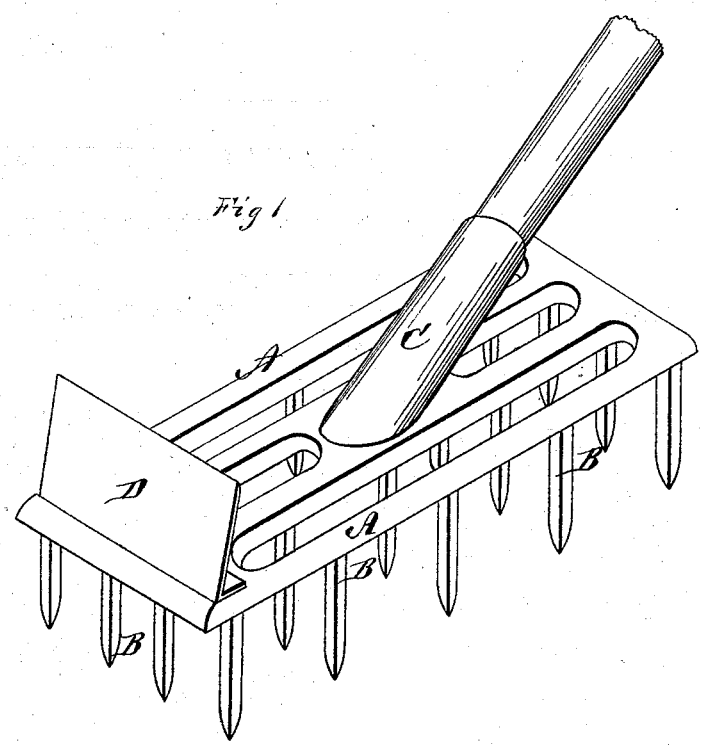
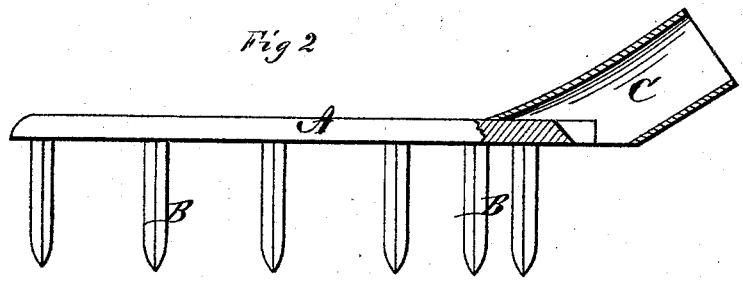

UNITED STATES PATENT OFFICE.

WILLIAM JONES, OF NEW ALBANY, INDIANA.

IMPROVEMENT IN GARDEN-WEEDING IMPLEMENTS.

Specification forming part of Letters Patent No. 143,354, dated September 30, 1873; application filed August 1, 1873.

*To all whom it may concern:*

Be it known that I, WILLIAM JONES, of New Albany, in the county of Floyd and in the State of Indiana, have invented certain new and useful Improvements in Garden-Weeding Implements; and do hereby declare that the following is a full, clear, and exact description thereof, reference being had to the accompanying drawings and to the letters of reference marked thereon, making a part of this specification.

The nature of my invention consists in the construction and arrangement of a garden-weeding implement, as will be hereinafter more fully set forth.

In order to enable others skilled in the art to which my invention appertains to make and use the same, I will now proceed to describe its construction and operation, referring to the annexed drawing, in which—

Figure 1 is a perspective view of my combined rake, and Fig. 2 is a side elevation, part in section, of the same.

A represents a rectangular frame of any suitable dimensions, made of cast metal or otherwise, and provided with longitudinal slots, making the frame resemble a series of parallel bars connected at their ends. In the frame thus constructed are inserted and secured a number of teeth, B B, which are in the form of a long and narrow spear-point. In the center or at one end of the frame A is secured an inclined socket, C, into which the handle is to be inserted and firmly secured. When the frame A is made of cast metal, the socket C will be or may be cast in one piece with the frame. At the front end on the upper side of the frame A is secured or formed a cutting or hoe blade, D, which inclines slightly toward the rear.

This implement is designed as a hand weeding-tool for gardening purposes, and with it the work of weeding during the growth of plants is more speedily and thoroughly done, and the soil left in a clean and loose condition.

Having thus fully described my invention, what I claim as new, and desire to secure by Letters Patent, is—

The within-described garden implement, consisting of the frame A, with socket C, teeth B B, and blade D, all constructed and arranged substantially as and for the purposes herein set forth.

In testimony that I claim the foregoing, I have hereunto set my hand this 14th day of July, 1873.

WILLIAM JONES.

Witnesses:
J. B. $\overset{\text{his}}{+}$ LASSWELL,
$\phantom{J. B. }{\text{mark.}}$
EDWARD G. HENRY.